United States Patent [19]

Ikeda

[11] Patent Number: 5,751,849
[45] Date of Patent: May 12, 1998

[54] METHOD AND APPARATUS FOR PROCESSING A DOCUMENT

[75] Inventor: Hiroaki Ikeda, Yokohama, Japan

[73] Assignee: Canon Kabushiki Kaisha, Tokyo, Japan

[21] Appl. No.: 648,886

[22] Filed: May 16, 1996

Related U.S. Application Data

[63] Continuation of Ser. No. 248,661, May 25, 1994, abandoned.

[30] Foreign Application Priority Data

Jun. 2, 1993 [JP] Japan .................................. 5-156245

[51] Int. Cl.⁶ .................................................. G06K 9/34
[52] U.S. Cl. .................... 382/176; 382/181; 382/229; 382/182; 358/462
[58] Field of Search ........................ 382/309, 155, 382/182, 181, 229, 176; 358/462

[56] References Cited

U.S. PATENT DOCUMENTS

| | | | |
|---|---|---|---|
| 4,944,022 | 7/1990 | Yasujima et al. | 382/10 |
| 5,027,420 | 6/1991 | Takebayashi et al. | 382/10 |
| 5,081,688 | 1/1992 | Sakuragi | 382/10 |
| 5,101,444 | 3/1992 | Wilson et al. | 382/10 |
| 5,123,062 | 6/1992 | Sangu | 382/57 |
| 5,150,434 | 9/1992 | Hori et al. | 382/57 |
| 5,163,099 | 11/1992 | Osaki et al. | 382/10 |

FOREIGN PATENT DOCUMENTS

| | | | |
|---|---|---|---|
| 0531060 | 3/1993 | European Pat. Off. | G06K 9/00 |
| 0544434 | 6/1993 | European Pat. Off. | G06K 9/00 |
| WO93-05481 | 3/1993 | WIPO | G06K 9/00 |

OTHER PUBLICATIONS

"System For An Intelligent Office Document Analysis, Recognition and Description", Signal Processing, May 1993, Netherlands, vol. 32, No. 1-2, No. 1-2, ISSN 0165-1684, pp. 161-190, P. Chauvet, et al.

IBM Technical Disclosure Bulletin, vol. 34, No.11, Apr. 1992, New York, US, pp. 22-23, anonymous, "Method of Differentiating Image from Text Within Documents".

*Primary Examiner*—Jose L. Couso
*Assistant Examiner*—Anh Hong Do
*Attorney, Agent, or Firm*—Fitzpatrick, Cella, Harper & Scinto

[57] ABSTRACT

A document processor edits non-coded image data and coded text data, and stores the data in a memory. If writing to a document being edited is requested by a user, a determination is made as to whether or not character recognition of a stored image is required. If character recognition is required, the stored image is cut out of the memory to obtain character images. The character images are provided to a character recognition unit which generates corresponding character codes which are written in the document being edited.

35 Claims, 11 Drawing Sheets

METHOD AND APPARATUS FOR PROCESSING A DOCUMENT

This application is a continuation, of application Ser. No. 08/248,661 filed May 25, 1994, now abandoned.

BACKGROUND OF THE INVENTION

1. Field of the Invention

The present invention relates to a method of and apparatus for processing a document. More specifically, the present invention relates to an apparatus that can be used for editing non-coded image data as well as coded text data.

2. Description of the Related Art

As word processors and computers have become popular, it has also become popular to convert documents into coded data and process them with a word processor or a computer. As a result, it has become easy to perform tasks such as editing, reediting, retrieving and reusing of documents. The capacity of an external storage device has become large, and the cost thereof has become low, and thus, it has become possible to store a large number of documents in the form of an image file by using a photoelectric conversion system such as an image scanner.

Documents that are stored in the form of an image file can be retrieved easily and quickly by using key words. Furthermore, as a result of advancements in character recognition techniques, it is also possible to easily convert an image of a document into coded data. In a representative technique of recognizing image characters of a stored document, the input image data is displayed on a screen, and an area desired to be recognized is specified. If recognition errors are observed after the character recognition, then correction is made.

In conventional document processing apparatus, a keyboard is used to input or delete characters. The location at which a character is to be inserted is also specified by a keyboard. A pointing device such as a mouse is used to specify an area of a document to be processed, or to select some processing from options indicated in a menu. The optional functions that can be selected from the menu include "Copy", which is used to store character strings within a specified portion of the document into a memory area; "Cut", which is used to store character strings within a specified portion of the document into a memory area and further remove that portion from the document being edited; and "Paste", which is used to write character strings stored in the memory area into the document being edited at a location at which the strings are specified to be inserted. These functions make editing tasks easy and effective. The processing described above can be performed not only for the same one document, but also for existing different documents as long as there are characters.

These processing functions, "Copy", "Cut" and "Paste" can be performed not only in editing of documents, but also in editing of images or drawings. If a character or an image or a drawing is selected, and "Copy" or "Cut" is performed on it, then the copied or cut data is stored in a memory area according to a format as shown in FIG. 11.

If some characters in a document that is being edited on a text editing screen area are selected, then a "character" designation is stored in an identification tag 1 to indicate that the data consists of character codes, and the character codes are stored in a data area 2, and data length and other information are stored in a header 3.

On the other hand, if a part of an image in an image editing area on the screen is selected, then an "image" designation is stored in the identification tag 1 to indicate that the data consists of an image, and image data is stored in the data area 2, and furthermore the data length, width, and height of the image as well as other information are stored in the header 3.

The document processing apparatus is configured such that when data placed in the memory area is tried to be "pasted" in the text editing area, "Paste" is allowed only in the case where the identification tag 1 includes a "character" designation, otherwise "Paste" is not allowed. On the other hand, the data can be pasted in the image editing area only if the data is an image. This feature prevents the incorrect writing of data when "copied" characters are tried to be "pasted" into the image editing area. However, in the prior art described above, when it is desired to incorporate a part of the document, that has not yet been coded into the text, it is required to perform character recognition by using a character recognition program or a character recognition apparatus so as to convert the image document or image document file into coded data. Only after such a conversion process has been performed, it becomes possible to perform "Cut" or "Copy" and then "Paste". Thus, the conventional apparatus requires a long and troublesome operation, that in some cases where the portion to be incorporated into text data does not include a very large number of characters, it would be easier and quicker to directly input the characters by a keyboard.

SUMMARY OF THE INVENTION

In view of the above, it is an object of the present invention to provide a method and apparatus for processing a document that has a shorter processing time compared to that of conventional apparatus in which an operator directly inputs characters via a keyboard. It is another object of the present invention to provide a method of processing a document and an apparatus therefor, that are so easy to use that an operator does not need any special technical knowledge.

According to a first aspect of the present invention to achieve the above objects, a method of processing a document comprises: an image displaying step of displaying an image; an image location acquisition step of acquiring information regarding a location in an image; an image specifying step of specifying a memory area for storing character codes or image information as well as specifying a text or an image that is to be stored in the memory area; an information storage instructing step of instructing that the specified information be stored; a write location specifying step of specifying a location to which the stored information is to be written; a write instructing step of instructing that the stored information be written to the specified location; a write decision step of deciding whether it is possible to write the stored information to the specified location; and a writing step of writing the stored information to the specified location when it has been decided that the information can be written to the specified location; wherein information of character codes may be written in the document that is being edited; and the method further comprises: a character recognition decision step of making a decision of whether character recognition should be performed in response to the issue of the instruction requesting that the image stored in the above-described memory area be written to the document; a dividing step of dividing the stored image into character images if it has been decided that the character recognition should be performed; a conversion step of recognizing the divided character images and converting them into character codes; and a character writing step of writing the converted character codes into the document being edited.

According to a second aspect of the present invention, an apparatus for processing a document comprises: image displaying means for displaying an image; image location acquisition means for acquiring information regarding a location in an image; image specifying means for specifying a memory area for storing character codes or image information as well as specifying text or image information that is to be stored in the memory area; information storage instructing means for instructing that the specified information be stored; write location specifying means for specifying a location to which the stored information is to be written; write instructing means for instructing that the stored information be written to the specified location; write decision means for deciding whether it is possible to write the stored information to the specified location; and writing means for writing the stored information to the specified location when it has been decided that the information can be written to the specified location; wherein information of character codes may be written in the document that is being edited; and the apparatus further comprises: character recognition decision means for making a decision of whether character recognition should be performed in response to the issue of the instruction requesting that the image stored in the above-described memory area be written to the document; dividing means for dividing the stored image into character images if it has been decided that the character recognition should be performed; conversion means for recognizing the divided character images and converting them into character codes; and character writing means for writing the converted character codes into the document being edited.

According to a third aspect of the present invention, a method of processing a document comprises: an image displaying step of displaying an image; an image location acquisition step of acquiring information regarding a location in an image; an image specifying step of specifying a memory area for storing a character, a code or image information as well as specifying a text or an image that is to be stored in the memory area; an information storage instructing step of instructing to store the specified information; a write location specifying a step of specifying a location to which the stored information is to be written; a write instructing step of issuing the instruction requesting that the stored information be written to the specified location; a write decision step of deciding whether it is possible to write the stored information to the specified location; and a writing step of writing the stored information to the specified location when it has been decided that the information can be written to the specified location; wherein information of character codes may be written in the document that is being edited; and the method further comprises: a division instruction step of issuing an instruction requesting the division of the image into character images; a dividing step of dividing the image into character images; a conversion step of recognizing the divided character images and converting them into character codes; and a character writing step of writing the converted character codes into the document being edited.

According to a fourth aspect of the present invention, an apparatus for processing a document comprises: image displaying means for displaying an image; image location acquisition means for acquiring information regarding a location in an image; image specifying means for specifying a memory area for storing a character, a code or image information as well as specifying a text or an image that is to be stored in the memory area; information storage instructing means for instructing to store the specified information; write location specifying means for specifying a location to which the stored information is to be written; write instructing means for issuing the instruction requesting that the stored information be written to the specified location; write decision means for deciding whether it is possible to write the stored information to the specified location; and writing means for writing the stored information to the specified location when it has been decided that the information can be written to the specified location; wherein information of character codes may be written in the document that is being edited; and the apparatus further comprises: division instruction means for issuing an instruction requesting the division of the image into character images; dividing means for dividing the image into character images; conversion means for recognizing the divided character images and converting them into character codes; and character writing means for writing the converted character codes into the document being edited.

With the above-described aspects of the present invention, only a simple operation is needed to convert character images into character codes so that the character images may be used in a document that is being edited. Thus it becomes possible to easily perform "Cut", "Copy", and "Paste" between an image and a document in a similar manner to that in a case where the process is performed between text-type documents. To use a part of an image-form document in a document that is being edited, it is only required to perform "Copy" or "Cut" on a specified portion of the image, and then perform "Paste" into the document being edited. Then character images are automatically recognized and inserted into the document being edited. This feature of the present invention makes the operation much easier and quicker compared to that of conventional character recognition apparatus, or that required to input characters via a keyboard.

DESCRIPTION OF THE PREFERRED EMBODIMENTS

Figure 1:
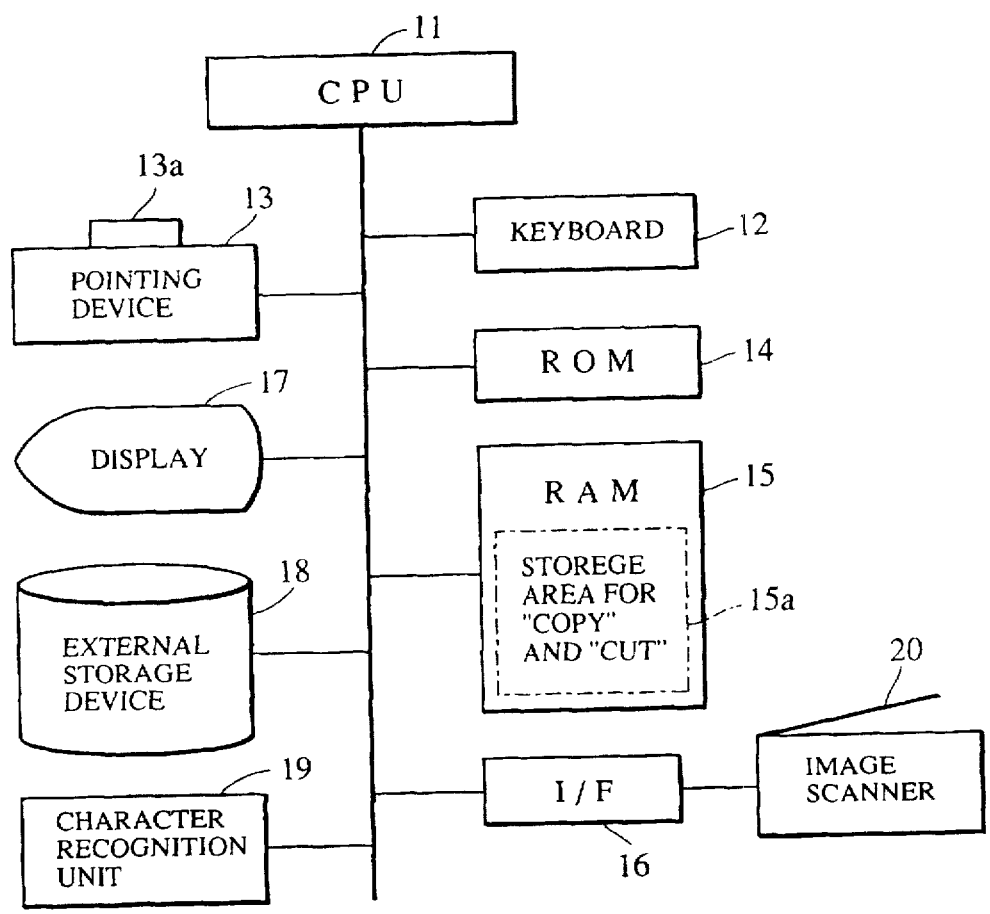
FIG. 1 is a block diagram illustrating a configuration of a document processing apparatus according to a first embodiment of the present invention.

Referring to the drawings, the present invention will be described in more detail.

First Embodiment:

A first embodiment of the present invention will be described, referring to FIGS. 1-5. FIG. 1 is a block diagram illustrating a configuration of a document processing apparatus according to the first embodiment of the present invention. In this figure a CPU (Central Processing Unit) 11 is responsible for the general control of the document processing apparatus according to a control program stored in a ROM (Read Only Memory) 14, which will be described later. The CPU 11 is connected via control lines to a keyboard 12, a pointing device 13, the ROM 14, a RAM (random access memory) 15, an I/F (interface) 16, a display device 17, an external storage device 18, and a character recognition unit 19.

The keyboard 12 has a large number of keys and is used to input or correct characters. The pointing device 13 may be a mouse, and is used to specify an image or an area of the image displayed on the display device 17 by operating a push button 13a.

The ROM 14 stores the control program which is executed by the CPU 11 to perform the process shown in a flow chart that will be described later, or other processes for the control of the document processing apparatus. The RAM 15 stores input images, recognition results, and other data. The RAM 15 includes a memory area 15a that is used to temporarily store the data obtained by performing "Copy" or "Cut".

The I/F 16 is connected to an image scanner 20 which is used to read image data. The display device 17 displays input images and other information. A CRT or liquid crystal display is used as the display device 17. The external storage device 18 includes a magnetic disk or the like, and is used to store various types of data.

To advantageously embody the present invention, the display device 17 may display information in a plurality of window areas so that separate operations may be performed in respective windows.

Figure 2:
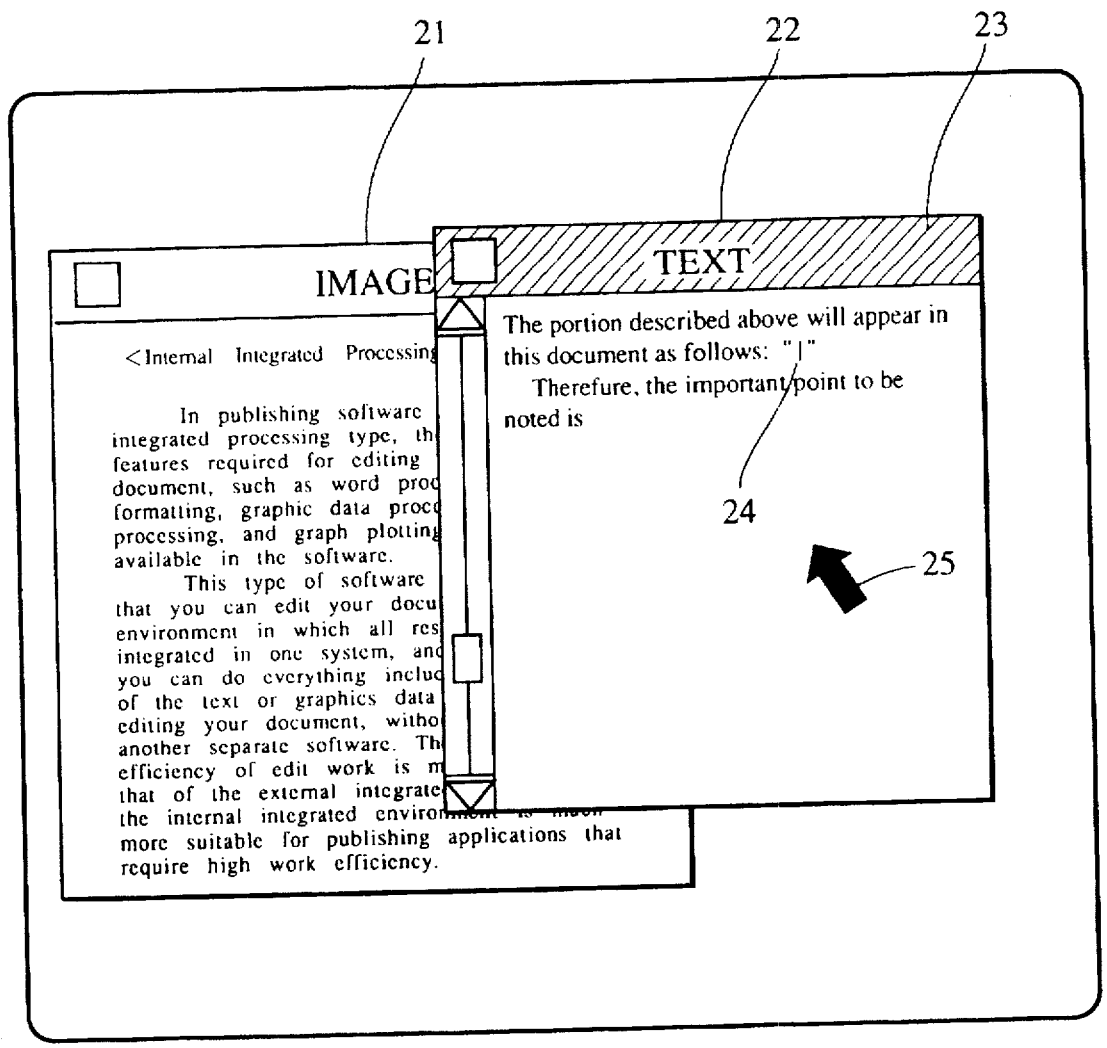
FIG. 2 is a diagram illustrating an example of what is displayed on a display device of the document processing apparatus according to the first embodiment of the present invention.

Referring to FIGS. 2-5, the processing steps that are performed by the document processing apparatus configured in such a manner as described above will be described below. FIG. 2 illustrates an example of what is displayed on the display device 17. In this example, a document that is being edited is displayed in a text window 22. A title bar 23 of the text window 22 is highlighted (hatched in FIG. 2) so as to indicate that the current active window that can accept inputting of data is the text window 22. An insertion point 24 indicates the location at which a character is to be added. A cursor 25 moves across the entire display area in response to the operation of the pointing device 13. An image window 21 is also displayed.

Figure 3:
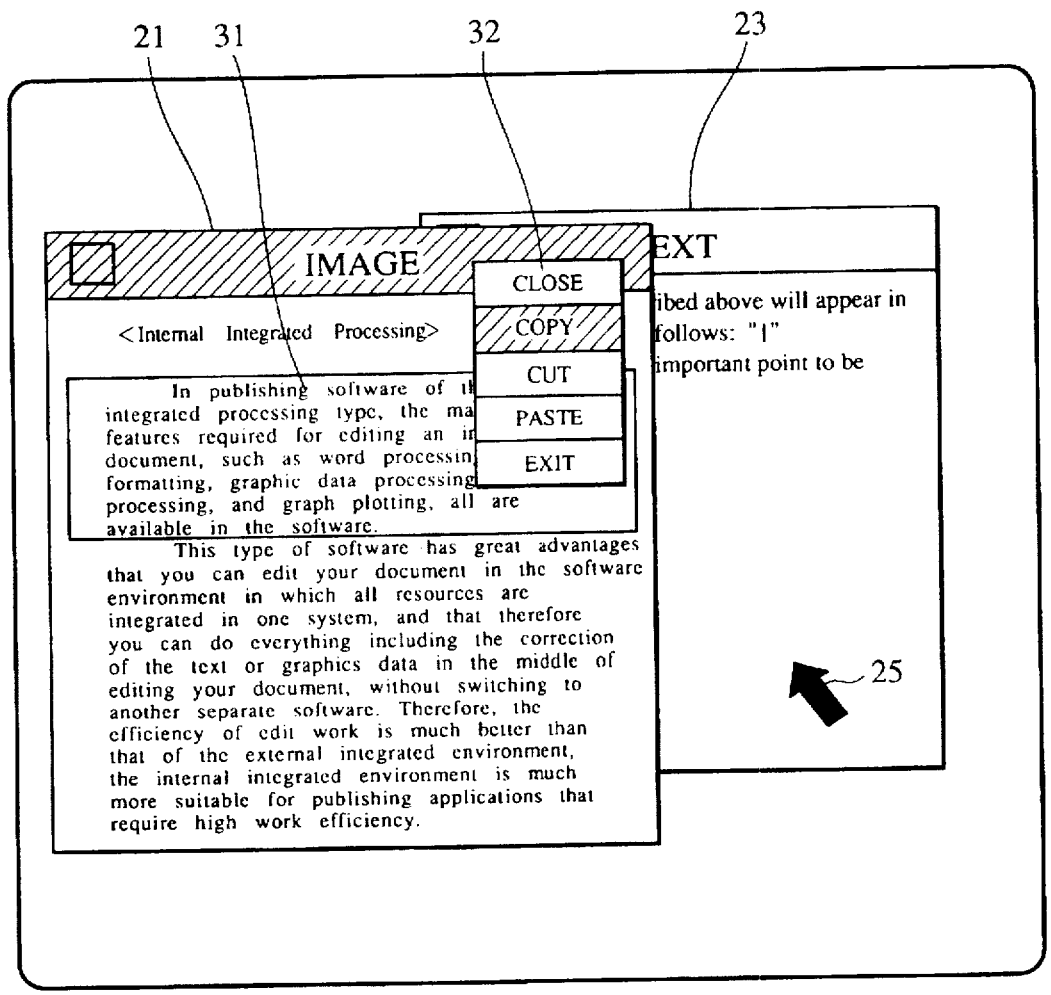
FIG. 3 is a diagram illustrating another example of what is displayed on the display device according to the first embodiment of the present invention.

FIG. 3 illustrates an example of what is displayed on the display device 17 during the process of "copying" a specified part of character images. In this case, the title bar of the image window 21 is highlighted (hatched in FIG. 3). An area that includes desired character images to be copied is specified by using the pointing device 13 in such a manner that a rectangular frame may surround that desired area. This specifying operation is performed according to the following steps: First, the cursor 25 is moved by using the pointing device 13 so that the cursor points to a first corner of where the rectangular frame is to be formed. Then, while holding the button 13a down, the cursor 25 is moved along a diagonal line to the opposite corner. Then, the push button 13a is released. Thus, a rectangular frame 31 is drawn, and the area within this rectangular frame 31 is specified as the area to be copied.

Figure 11:
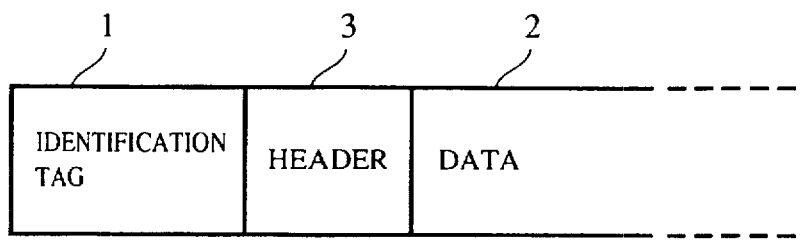
FIG. 11 is a schematic representation illustrating a format applied to data to be stored in a memory area.

After specifying the desired area to be copied, a function menu 32 is presented and the "Copy" function can be selected from the menu. The function menu 32 will appear on the screen if the cursor 25 is moved to the title bar of the window, and then the push button 13a of the pointing device 13 is pressed. If the "Copy" function is selected from the function menu 32, the menu element "Copy" is highlighted (hatched in FIG. 3). After the above-described successive operations, the image information is stored in the "Copy" and "Cut" memory area 15a of the RAM 15 according to the format represented in FIG. 11. When the process is complete, the specifying frame 31 and the menu 32 are removed from the screen.

Figure 4:
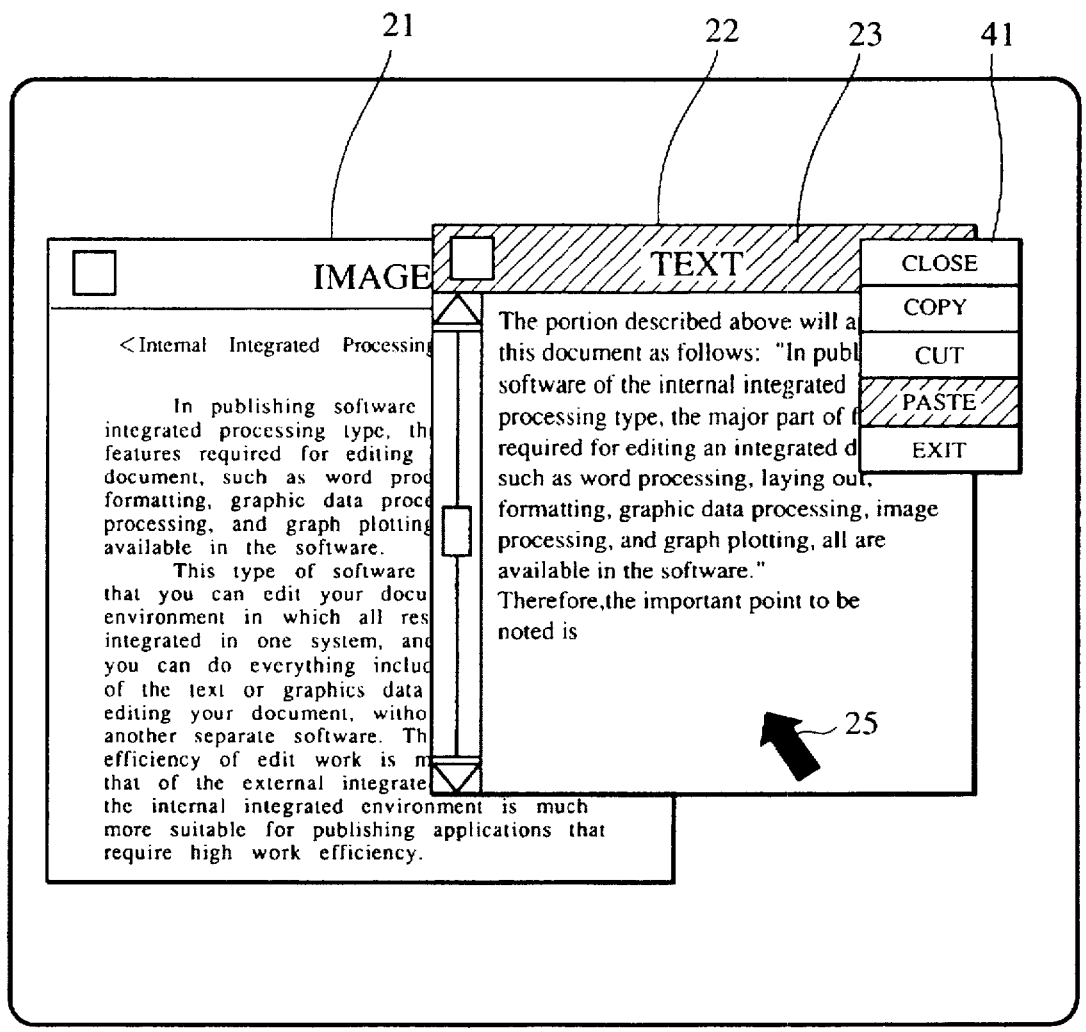
FIG. 4 is a diagram illustrating still another example of what is displayed on the display device according to the first embodiment of the present invention.
Figure 5:
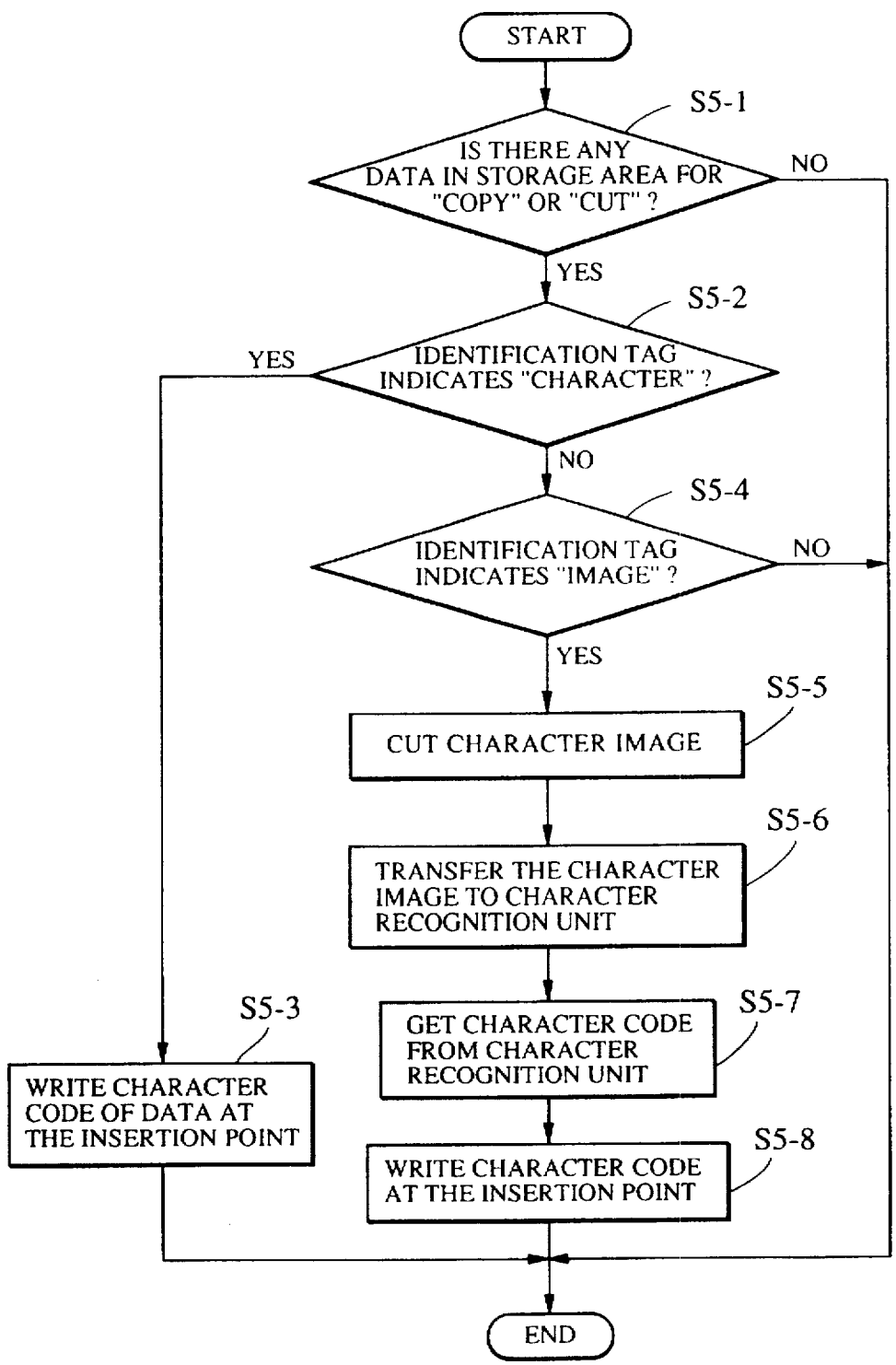
FIG. 5 is a flow chart showing the control procedure of "Paste" that is executed by the document processing apparatus according to the first embodiment of the present invention.

FIG. 4 illustrates an example of what is displayed on the display device 17 during a process in which stored character images are recognized and written into a document that is being edited. In this case, the title bar 23 of the text window 22 is highlighted. First, the insertion point 'I' (FIG. 2) is moved to the location at which text included in the image that has been stored in the "Copy" and "Cut" area of the RAM 15 is to be written. The insertion point can be moved by moving the cursor 25 and then by pressing the button 13a of the pointing device 13. Then, the function menu 41 is displayed. If "Paste" is selected, the menu element indicating "Paste" is highlighted (hatched in FIG. 4). The process flow of "Paste" will be described, referring to the flow chart of FIG. 5. At the first step, S5-1, the CPU 11 examines whether there is any data in the "Copy" and "Cut" area 15a of the RAM 15. If there is no data, then the process will be ended without doing anything. If the presence of data is detected in the step S5-1, then the process proceeds to step S5-2 at which the CPU 11 examines whether the identification flag 1 indicates "character". If yes, then at step S5-3, the CPU 11 writes the character codes included in the data area 2 into the document at the location indicated by the insertion point, in a manner similar to that in conventional techniques. Then, the process is ended. If the result of step S5-2 shows that the identification tag 1 indicates something other than "character", then the process proceeds to step S5-4 at which the CPU 11 examines whether the identification tag 1 indicates "image".

If the result of step S5-4 is no, the process is ended. If the result of step S5-4 is yes, then at step S5-5, the CPU 11 cuts out the image data included in the data area 2 (FIG. 11) character by character so as to generate character images. The CPU 11 sends these character images to the character recognition unit 19 at step S5-6. At step S5-7 the character images are converted into character codes according to known techniques, and CPU 11 then obtains these character codes from the character recognition unit 19.

At step S5-8 CPU 11 writes the character codes into the document that is being edited at the insertion point. Then, the process is ended. If "Paste" is complete according to the above-described steps, the function menu 41 is removed from the screen. According to this embodiment of the invention as described above, a desired part of an image-type document can be "cut", "copied" and "pasted", and can be written into a document being edited in the same fashion as in the case of text-type document.

Instead of selecting a function via the function menu, the function selection may also be performed via the keyboard if these functions are assigned to appropriate keys. In this case, the operation can be performed more quickly.

Second Embodiment:

Now, a second embodiment of the present invention will be described referring to FIGS. 6-10. The configuration of the apparatus for processing a document used for this embodiment is the same as that of the first embodiment, that is shown in FIG. 1. Therefore, FIG. 1 will also be used for the following explanation.

Figure 6:
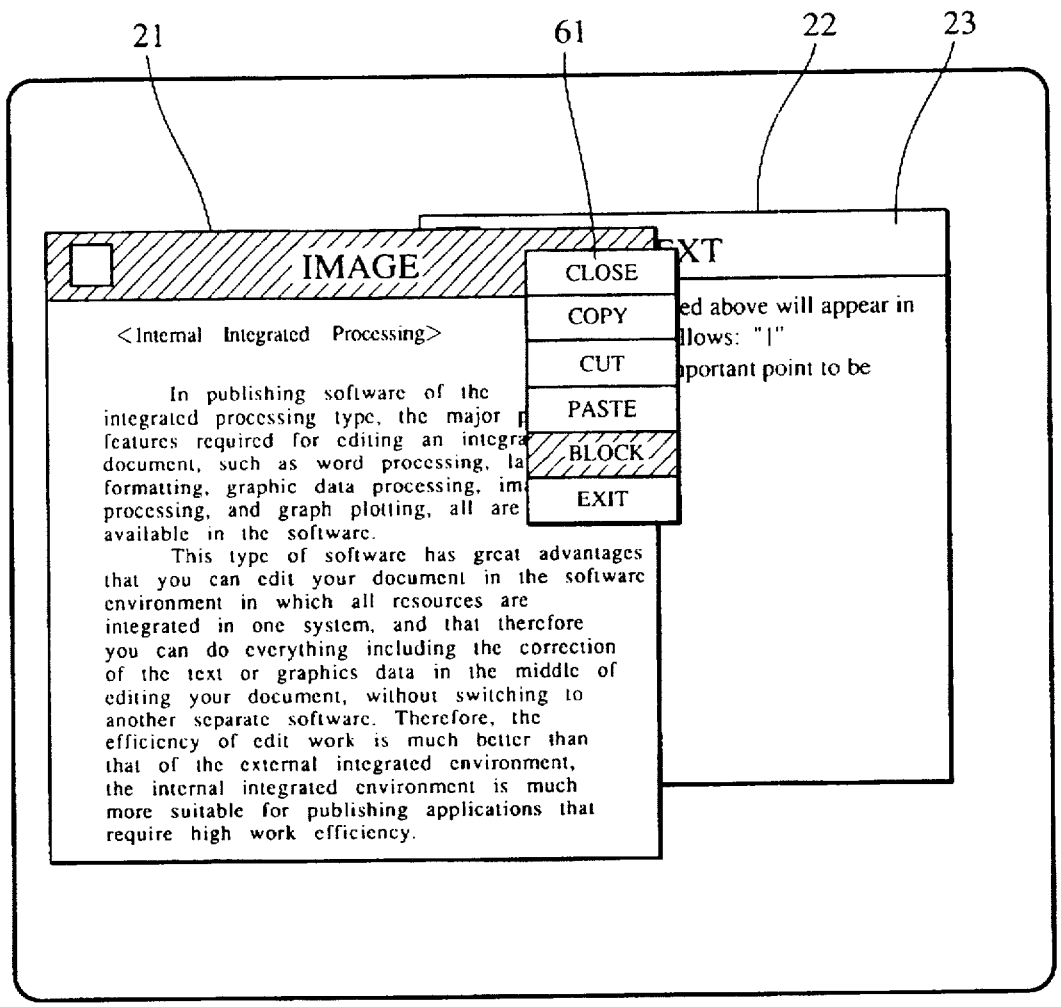
FIG. 6 is a diagram illustrating an example of what is displayed on a display device of a document processing apparatus according to a second embodiment of the present invention.

FIG. 6 illustrates an example of what is displayed on the display device 17 during a "Block" process. As shown in FIG. 6, the title bar of image window 21 is highlighted (hatched in FIG. 6), and the menu element representing "Block" in the function menu 61 is also highlighted to indicate that "Block" is selected.

Figure 7:
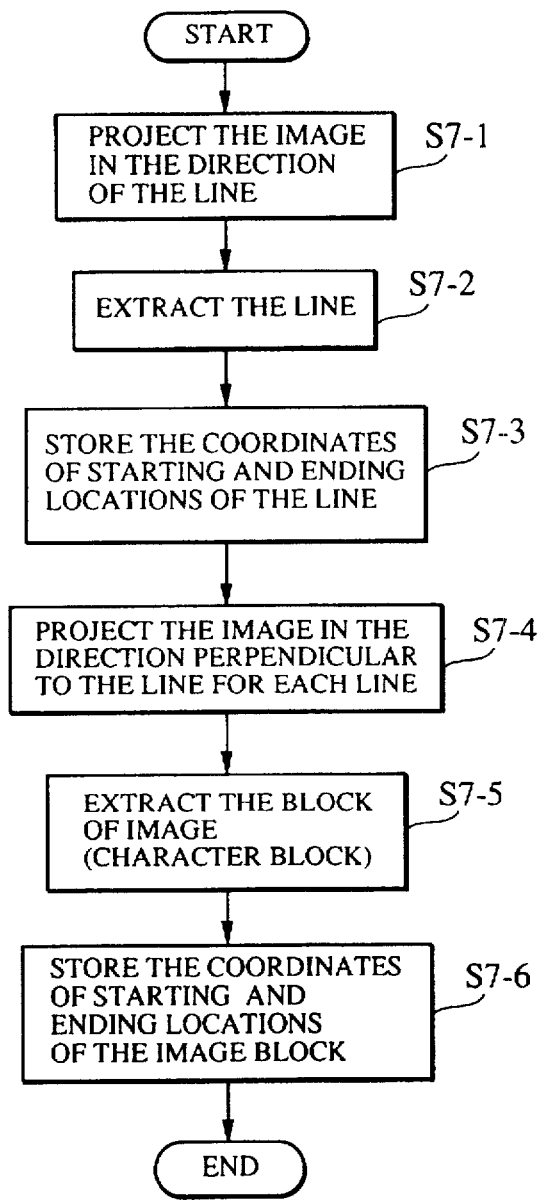
FIG. 7 is a flow chart showing the control procedure of "Block" that is executed by the document processing apparatus according to the second embodiment of the present invention.

FIG. 7 shows the flow of the process that is perfomed when "Block" is selected from the function menu 61.

Figure 8:
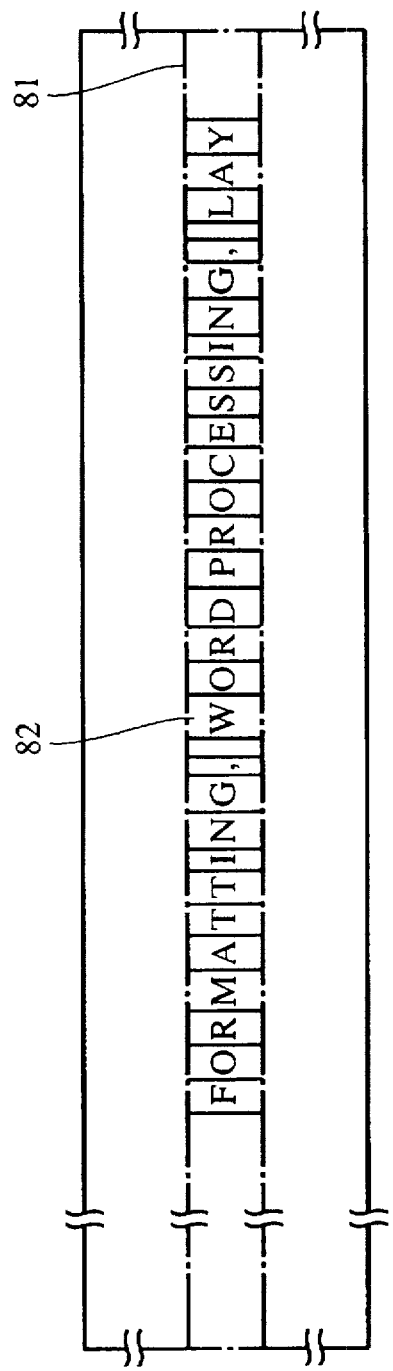
FIG. 8 is a diagram of a part of an image displayed on the display device of the document processing apparatus according to the second embodiment of the present invention.
Figure 9:
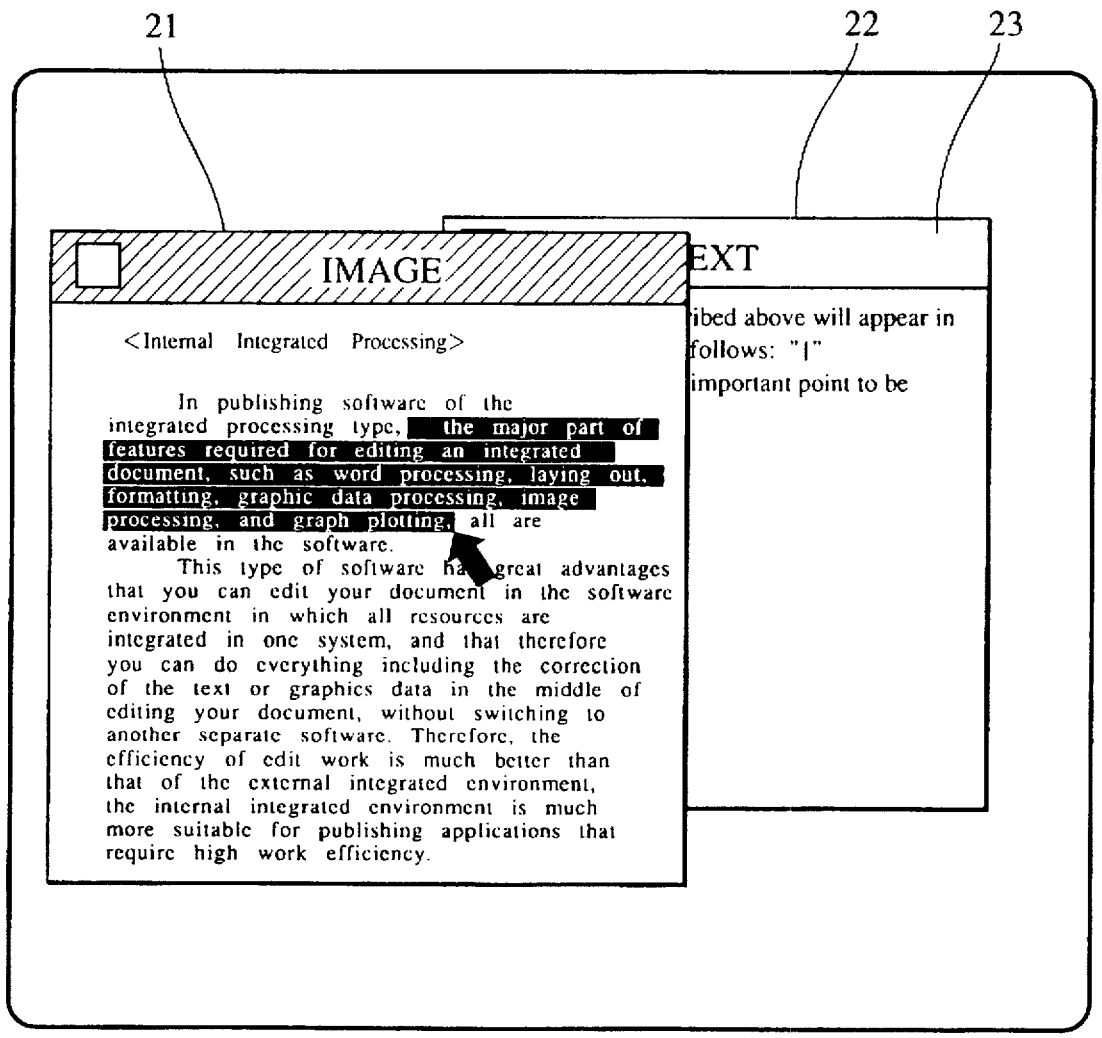
FIG. 9 is a diagram of an example of what is displayed on the display device of the document processing apparatus according to the second embodiment of the present invention.

At step S7-1 in FIG. 7, the CPU scans the image in the line direction, and then at step S7-2, extracts lines. For each extracted line, CPU 11 stores the starting and ending coordinates of the line in the RAM 15 at step S7-3. At step S7-4 CPU 11 scans the image for each line in the direction perpendicular to the line. At step S7-5 CPU 11 extracts image blocks each preferably consisting of a character block. Finally, at step S7-6 CPU 11 stores the starting and ending coordinates of each image block in the RAM 15. Then, the process is complete. FIG. 8 illustrates a part of the image that is displayed on the display device 17 after the above-described process. In this figure, reference numeral 81 denotes a rectangle representing one extracted line, and reference numeral 82 denotes one extracted image block. When "Block" is complete, the function menu 61 is removed from the screen. FIG. 9 illustrates an example of what is displayed on the display device 17 when image blocks are specified. In this case, the title bar of the image window 21 is highlighted (hatched in FIG. 9). The cursor is moved via the pointing device 13 to the starting or ending position of a desired area of the document to be specified, and then the cursor 25 is moved to the opposite end of the area while holding the push button 13a down.

When the cursor 25 reaches the desired position, the push button 13a is released. Then, the specified area will be displayed in an inverted display mode. Instead of altering the entire area into the inverted display mode, each image block within the specified area may be inverted as shown in FIG. 9. When the specified image is subjected to the "Copy" process, the block area of the image information is stored in the "Copy" and "Cut" area of the memory area 15a according to the format shown in FIG. 11, that is the image information is stored in the data area 2, and "image block" is written in the identification tag 1.

Figure 10:
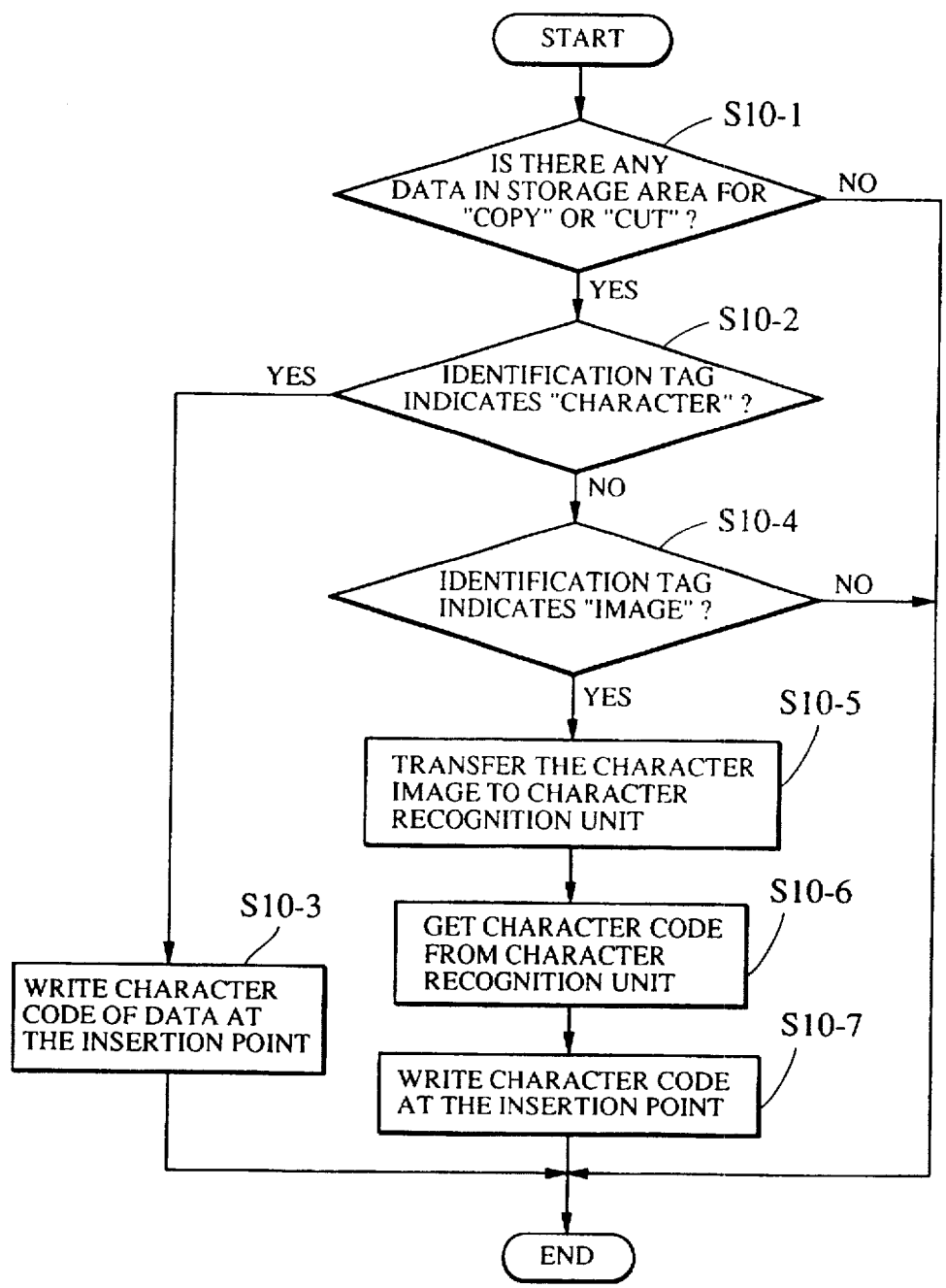
FIG. 10 is a flow chart showing the control procedure of "Paste" that is executed by the document processing apparatus according to the second embodiment of the present invention.

FIG. 10 shows the process flow of the "Paste" function that is performed when "Paste" is selected. At step S10-1 CPU 11 examines whether there is any data in the "Copy" and "Cut" area 15a of the RAM 15. If there is no data, then the process is ended without doing anything. If the presence of data is detected in step S10-1, then the process proceeds to step S10-2 at which time CPU 11 examines whether the identification flag 1 includes "character". If yes, then at step S10-3 the CPU 11 writes the character codes included in the data area 2 into the document at the location indicated by the insertion point 1 (FIG. 2) in a manner similar to that in conventional techniques. Then, the process is ended. If the result of step S10-2 shows that the identification tag 1 includes something other than "character", then the process proceeds to step S10-4 at which time CPU 11 examines whether the identification tag 1 indicates "image block". If no, then "Paste" is impossible, and the process is ended.

If the result of step S10-4 is yes, then at step S10-5 CPU 11 sends these character image blocks to the character recognition unit 19. At step S10-6, the character images are inverted into character codes according to known techniques, and then CPU 11 obtains these character codes from the character recognition unit 19. At step S10-7 CPU 11 writes the character codes into the document that is being edited at the insertion point. Then, the process is ended.

In this embodiment, as described above, it is possible to specify an image consisting of character unit blocks. As a result, it becomes unnecessary to perform additional editing tasks such as deleting of undesired portions of the image after "Paste" is complete. This makes the editing task easier and quicker.

In this embodiment, the character recognition is performed when "Paste" is selected. Alternatively, the character recognition may be performed when "Copy" is performed. In this case, character codes are stored in the "Copy" and "Cut" area 15a of the RAM 15. As a result, "Paste" can be executed by directly writing these character codes.

Furthermore, in this embodiment, there is provided the character recognition unit 19, however alternatively CPU 11 may perform the character recognition. In this case, the character recognition unit 19 is not required.

What is claimed is:

1. A method of processing a document, comprising the steps of:

specifying data as a type of data;

specifying a location in the document into which the specified data are to be written;

judging whether the type of the specified data is text;

determining whether a character recognition of the specified data is to be performed in response to a judgement that the type of specified data is not text, and converting the specified data into character codes; and writing the character codes which are a result of the recognition into the specified location.

2. A method of processing a document according to claim 1, further comprising an image displaying step of displaying an image on a display device, wherein the data stored in said specified data storing step are specified based on the displayed image.

3. A method of processing a document according to claim 2, wherein the image displayed in said image displaying step is image data that are input through an image scanner.

4. A method of processing a document according to claim 2, wherein said image displaying step of displaying an image is performed by using a CRT.

5. A method of processing a document according to claim 2, wherein said image displaying step displays an image by using a liquid crystal display device.

6. A method of processing a document according to claim 2, wherein the information regarding a location of an image, that is acquired in said image location acquisition step, is defined by a location that is pointed to by a pointing device.

7. A method of processing a document according to claim 2, further comprising a display step of displaying the image data and the text data simultaneously.

8. A method of processing a document according to claim 1, wherein said character recognition step further comprising:
   a segmentation step of segmenting the specified data into character pattern image data; and
   a conversion step of recognizing the segmented character pattern image data and converting them into character codes.

9. A method of processing a document according to claim 1, wherein the specified data comprises the segmented character pattern image data.

10. A method of processing a document, comprising the steps of:
   acquiring data identified as a type of data;
   specifying a destination in the document to which the acquired data is to be output;
   judging whether the acquired data is the same type of data as data at the destination specified by said destination specifying step;
   deciding whether conversion of a type of data is to be performed in response to judgment that the acquired data is not the same type of data as the data at the destination specified by said destination specifying step;
   converting the type of the acquired data in response to the decision that the conversion is to be performed in said decision step; and
   outputting the data obtained by the conversion to the specified destination 11. A method of processing a document according to claim 10, wherein the image acquired in said image acquisition step is image information that is input through an image scanner.

12. A method of processing a document according to claim 10, wherein the destination specified by said destination specifying step is a window on a screen of a display device.

13. A method of processing a document according to claim 12, wherein the display device is a CRT.

14. A method of processing a document according to claim 12, wherein the display device is a liquid crystal display device.

15. A method of processing a document according to claim 10, wherein said destination specifying step of specifying the destination is performed by using a pointing device.

16. An apparatus for processing a document, comprising:
   data specifying means for specifying data as a type of data;
   writing location specifying means for specifying a location in the document into which the specified data are to be written;
   data type judging means for judging whether the type of the specified data is text;
   a determining step of determining whether a character recognition of a specified data is to be performed in response to a judgement that the type of specified data is not text and converting the specified data into character codes; and
   character writing means for writing the character codes which are a result of the recognition into the specified location.

17. An apparatus for processing a document according to claim 16, further comprising an image displaying mean for displaying an image on a display device, wherein the data stored in said specified data storing means are specified based on the displayed image.

18. An apparatus for processing a document according to claim 17, wherein the image displayed on said image displaying means is image data that are input through an image scanner.

19. An apparatus for processing a document according to claim 17, wherein said image displaying means uses a CRT.

20. An apparatus for processing a document according to claim 17, wherein said image displaying means is a liquid crystal display device.

21. An apparatus for processing a document according to claim 17, wherein the information regarding a location of an image, that is acquired by said image location acquisition means, is defined by a location that is pointed to by a pointing device.

22. An apparatus for processing a document according to claim 17, further comprising a display means for displaying the image data and the test data simultaneously.

23. An apparatus for processing a document according to claim 16, wherein said character recognition means further comprising:
   a segmentation means for segmenting the specified data into character pattern image data; and
   a conversion means for recognizing the segmented character pattern image data and converting them into character codes.

24. An apparatus for processing a document according to claim 16, wherein the specified data comprises the segmented character pattern image data.

25. An apparatus for processing a document, comprising:
   data acquisition means for acquiring data as a type of data;
   destination specifying means for specifying a destination in the document to which the acquired data is to be output;
   a data type judging means for judging whether the acquired data is the same type of data as data at the destination specified by said destination specifying means;
   decision means for deciding whether conversion of a type of data is to be performed in response to judgment that the acquired data is not the same type of data as the data at the destination specified by said destination specifying means;
   conversion means for converting the type of the acquired data in response to the decision that the conversion is to be performed by said decision means; and
   output means for outputting the data obtained by the conversion to the specified destination.

26. An apparatus for processing a document according to claim 25, wherein the image acquired by said image acquisition means is image information that is input through an image scanner.

27. A method of processing a document according to claim 25, wherein the destination specified by said destination specifying means is a window on a screen of a display device.

28. An apparatus for processing a document according to claim 25, wherein said display device is a CRT.

29. An apparatus for processing a document according to claim 25, wherein said display device is a liquid crystal display device.

30. An apparatus for processing a document according to claim 25, wherein said destination specifying means for specifying the destination is performed by using a pointing device.

31. A method of processing a document stored in a computer readable memory which stores programming code, comprising the steps of:
   specifying data as a type of data;
   specifying a location in the document into which the specified data are to be written;
   judging whether the type of the specified data is text;
   determining whether a character recognition of the specified data is to be performed in response to a judgement that the type of specified data is not text, and converting the specified data into character codes; and
   writing the character codes which are a result of the recognition into the specified location.

32. A method of processing a document stored in a computer readable memory which stores programming code, comprising the steps of:
   acquiring data as a type of data;
   specifying a destination in the document to which the acquired data is to be output;
   judging whether the acquired data is the same type of data as data at the destination specified by said destination specifying step;
   deciding whether conversion of a type of data is to be performed in response to judgment that the acquired data is not the same type of data as the data at the destination specified by said destination specifying step;
   converting the type of the acquired data in response to the decision that the conversion is to be performed in said decision step; and
   outputting the data obtained by the conversion to the specified destination.

33. An apparatus for processing a document stored in a computer readable memory which stores programming code, comprising:
   data specifying means for specifying data as a type of data;
   writing location specifying means for specifying a location in the document into which the specified data are to be written;
   data type judging means for judging whether the type of the specified data is text;
   a determining step of determining whether a character recognition of the specified data is to be performed in response to a judgement that the type of specified data is not text, and converting the specified data into character codes; and
   character writing mean for writing the character codes which are a result of the recognition into the specified location.

34. An apparatus for processing a document stored in a computer readable memory which stores programming code, comprising:
   data acquisition means for acquiring data as a type of data;
   destination specifying means for specifying a destination in the document to which the acquired data is to be output;
   a data type judging means for judging whether the acquired data is the same type of data as data at the destination specified by said destination specifying means;
   decision means for deciding whether conversion of a type of data is to be performed in response to judgment that the acquired data is not the same type of data as the data at the destination specified by said destination specifying means;
   conversion means for converting the type of the acquired data in response to the decision that the conversion is to be performed by said decision means; and
   output means for outputting the data obtained by the conversion to the specified destination.

35. A method of processing a document comprising the steps of:
   specifying data as a type of data;
   specifying a location in text data into which the psecified data are to be written;
   judging whether the specified data is the same type of data as the text data at the location specified by said location specifying step;
   determining whether a recognition of the specified data is to be performed in response to a judgment that the specified data is not the same type of data as the text data at the location specified by said location specifying step, and converting the specified data into character codes; and
   writing the character codes into the specified location.

* * * * *

UNITED STATES PATENT AND TRADEMARK OFFICE
CERTIFICATE OF CORRECTION

PATENT NO. : 5,751,849

DATED : May 12, 1998

INVENTOR(S) : HIROAKI IKEDA

It is certified that error appears in the above-identified patent and that said Letters Patent is hereby corrected as shown below:

COLUMN 9 line 66,   "mean" should read --means--.

COLUMN 12 line 4,    "mean" should read --means--; and
   line 34,   "psecified" should read --specified--.

Signed and Sealed this

Seventeenth Day of November, 1998

Attest:

BRUCE LEHMAN

*Attesting Officer*        *Commissioner of Patents and Trademarks*